(12) United States Patent
McCorkle

(10) Patent No.: US 7,315,564 B2
(45) Date of Patent: Jan. 1, 2008

(54) ANALOG SIGNAL SEPARATOR FOR UWB VERSUS NARROWBAND SIGNALS

(75) Inventor: John W. McCorkle, Laurel, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/214,741

(22) Filed: Aug. 31, 2005

(65) Prior Publication Data

US 2006/0078038 A1 Apr. 13, 2006

Related U.S. Application Data

(63) Continuation of application No. 09/685,198, filed on Oct. 10, 2000, now Pat. No. 7,006,553.

(51) Int. Cl.
*H04B 1/69* (2006.01)

(52) U.S. Cl. .................................... 375/130

(58) Field of Classification Search ................ 375/130, 375/295, 200, 239; 333/170; 445/110; 455/14; 348/607
See application file for complete search history.

(56) References Cited

U.S. PATENT DOCUMENTS

| | | | |
|---|---|---|---|
| 2,671,896 A | 3/1954 | deRosa | |
| 3,662,316 A | 5/1972 | Robbins | |
| 3,806,795 A | 4/1974 | Morey | |
| 4,577,168 A * | 3/1986 | Hartmann | .................... 333/170 |
| 4,613,978 A | 9/1986 | Kurth et al. | |
| 4,635,005 A | 1/1987 | Kaminsky | |
| 5,325,204 A * | 6/1994 | Scarpa | ........................ 348/607 |
| 5,337,054 A | 8/1994 | Ross et al. | |
| 5,345,471 A | 9/1994 | McEwan | |
| 5,426,618 A | 6/1995 | Chen et al. | |
| 5,677,927 A | 10/1997 | Fullerton et al. | |
| 5,764,696 A * | 6/1998 | Barnes et al. | ................ 375/239 |
| 5,872,540 A | 2/1999 | Casabona et al. | |
| 5,901,172 A | 5/1999 | Fontana et al. | |
| 6,021,322 A * | 2/2000 | Hatada et al. | ........... 455/193.1 |
| 6,026,125 A * | 2/2000 | Larrick et al. | ............... 375/295 |
| 6,185,418 B1* | 2/2001 | MacLellan et al. | ......... 455/418 |
| 6,215,359 B1* | 4/2001 | Peckham et al. | ........... 330/302 |
| 6,304,623 B1 | 10/2001 | Richards et al. | |
| 6,351,246 B1 | 2/2002 | McCorkle | |
| 6,400,963 B1* | 6/2002 | Glockler et al. | ......... 455/553.1 |
| 6,438,360 B1 | 8/2002 | Alberth et al. | |

(Continued)

OTHER PUBLICATIONS

U.S. Appl. No. 60/207,225, filed May 26, 2000, McCorkle.

(Continued)

*Primary Examiner*—Don N. Vo

(57) ABSTRACT

A system, method, and computer program product for removing "narrowband" interference from a broader spectrum containing a UWB signal, in a receiver of the UWB signal. The RFI is extracted from a broader spectrum to remove interference from the UWB signal, by employing an impulse response in a radio front-end of the UWB receiver that is matched with an incoming wavelet employed as part of a UWB signal to be received, matching the impulse response to the wavelet and its time-shifted and inverted versions, passing the wavelet unscathed through the receiver, and excising narrowband signals (continuous tones). Exemplary embodiments for the RFI extraction mechanism include a transmission line circuit, an active transmission line circuit, and an adaptable, controllable phase delay circuit.

20 Claims, 10 Drawing Sheets

U.S. PATENT DOCUMENTS 6,501,942 B1 * 12/2002 Weissman et al. ............ 455/14
6,505,032 B1    1/2003  McCorkle
6,556,621 B1    4/2003  Richards et al.
6,700,939 B1    3/2004  McCorkle
6,735,238 B1    5/2004  McCorkle
6,751,202 B1    6/2004  Henrie

OTHER PUBLICATIONS

U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,196, filed Oct. 10, 2000, Miller.
U.S. Appl. No. 09/685,197, filed Oct. 10, 2000, Miller.
U.S. Appl. No. 09/685,199, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
U.S. Appl. No. 09/685,205, filed Oct. 10, 2000, McCorkle.
T. Miller et al., IEEEE Transactions on Aerospace and Electronic Systems, vol. 33, No. 4, XP-000726070, pp. 1142-1156, "RFI Suppression for Ultra Wideband Radar", Oct. 1, 1997.
P. Phu et al., IEEE MTT-Symposium Digest, vol. 3, XP-000767007, pp. 1135-1138, "An Ultra-Wideband Exciter for Ground-Penetration Radar Systems", Jun. 8, 1997.
R. Comerford, IEEE Spectrum, pp. 35-41, "Handhelds Duke It Out for the Internet", Aug. 2000.

* cited by examiner

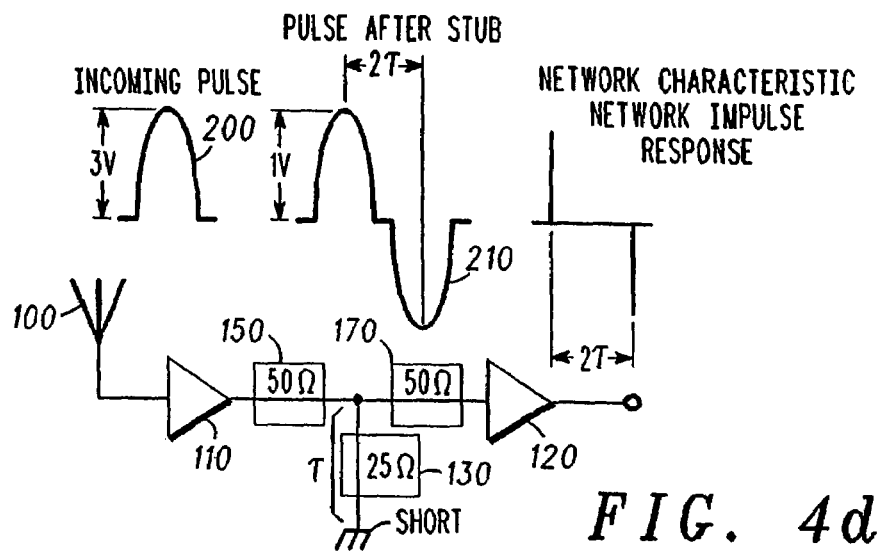
FIG. 4d
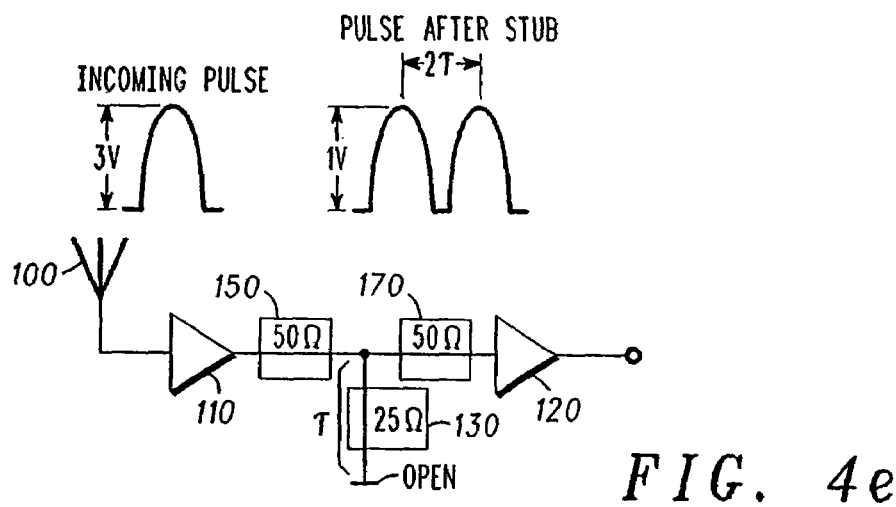
FIG. 4e
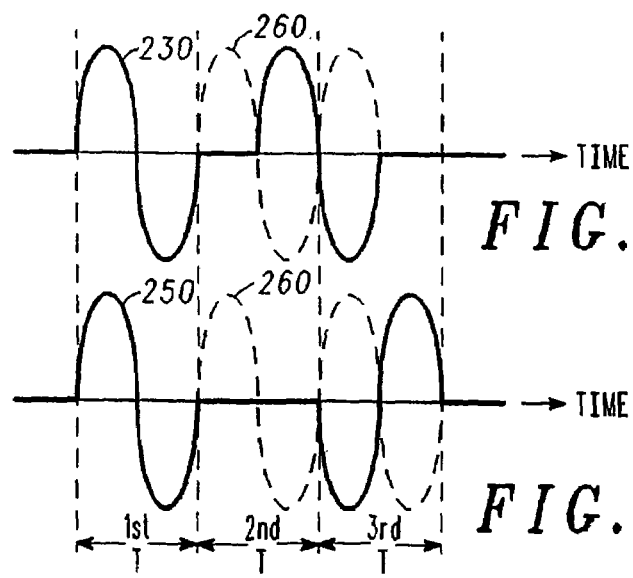
FIG. 6a
FIG. 6b

ANALOG SIGNAL SEPARATOR FOR UWB VERSUS NARROWBAND SIGNALS

CROSS REFRERENCE TO RELATED PATENT DOCUMENTS

The present application is a continuation application of Ser. No. 09/685,198, filed Oct. 10, 2000, now U.S. Pat. No. 7,006,553 entitled ANALOG SIGNAL SEPARATOR FOR UWB VERSUS NARROWBAND SIGNALS.

The present document contains subject matter related to that disclosed in commonly owned, co-pending application Ser. No. 09/209,460 filed Dec. 11, 1998, entitled ULTRA WIDE BANDWIDTH SPREAD-SPECTRUM COMMUNICATIONS SYSTEM; Ser. No. 09/633,815 filed Aug. 7, 2000, entitled ELECTRICALLY SMALL PLANAR UWB ANTENNA; application Ser. No. 09/563,292 filed May 3, 2000, entitled PLANAR ULTRA WIDE BAND ANTENNA WITH INTEGRATED ELECTRONICS; Application Ser. No. 60/207,225 filed May 26, 2000, entitled ULTRA WIDEBAND COMMUNICATION SYSTEM AND METHOD; Application Ser. No. 60/238,466, filed Oct. 10, 2000, entitled ULTRA WIDE BANDWIDTH NOISE CANCELLATION MECHANISM AND METHOD; Application Ser. No. 60/217,099 filed Jul. 10, 2000, entitled MULTIMEDIA WIRELESS PERSONAL AREA NETWORK (WPAN) PHYSICAL LAYER SYSTEM AND METHOD; application Ser. No. 09/685,203, filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400, filed Oct. 10, 2000, entitled ULTRA WIDEBAND COMMUNICATION SYSTEM, METHOD, AND DEVICE WITH LOW NOISE PULSE FORMATION; application Ser. No. 09/685,195, filed Oct. 10, 2000, entitled ULTRA WIDE BANDWIDTH SYSTEM AND METHOD FOR FAST SYNCHRONIZATION; application Ser. No. 09/684,401, filed Oct. 10, 2000, entitled ULTRA WIDE BANDWIDTH SYSTEM AND METHOD FOR FAST SYNCHRONIZATION USING SUB CODE SPINS; application Ser. No. 09/685,196, filed Oct. 10, 2000, entitled ULTRA WIDE BANDWIDTH SYSTEM AND METHOD FOR FAST SYNCHRONIZATION USING MULTIPLE DETECTION ARMS (Attorney Docket No. 195273US8); application Ser. No. 09/685,199, filed Oct. 10, 2000, entitled A LOW POWER, HIGH RESOLUTION TIMING GENERATOR FOR ULTRA-WIDE BANDWIDTH COMMUNICATION SYSTEMS; application Ser. No. 09/685,202, filed Oct. 10, 2000, entitled METHOD AND SYSTEM FOR ENABLING DEVICE FUNCTIONS BASED ON DISTANCE INFORMATION; application Ser. No. 09/685,201, filed Oct. 10, 2000, entitled CARRIERLESS ULTRA WIDEBAND WIRELESS SIGNALS FOR CONVEYING APPLICATION DATA; application Ser. No. 09/685,205, filed Oct. 10, 2000, entitled SYSTEM AND METHOD FOR GENERATING ULTRA WIDEBAND PULSES; application Ser. No. 09/684,782, filed Oct. 10, 2000, entitled ULTRA WIDEBAND COMMUNICATION SYSTEM, METHOD, AND DEVICE WITH LOW NOISE RECEPTION; and application Ser. No. 09/685,200, filed Oct. 10, 2000, entitled LEAKAGE NULLING RECEIVER CORRELATOR STRUCTURE AND METHOD FOR ULTRA WIDE BANDWIDTH COMMUNICATION SYSTEM (Attorney Docket No. 1541.1001/GMG), the entire contents of each of which being incorporated herein by reference.

BACKGROUND OF THE INVENTION

1. Field of the Invention

The present invention relates to radio frequency communication receivers, systems and methods employing ultra wide band (UWB) signaling techniques. More particularly, the present invention relates to systems, methods and computer program product configured to remove "narrowband" energy from a broader spectrum containing a UWB signal, in a UWB receiver.

2. Description of the Background

Wireless communication systems operate on the principle of using a transmitter that is configured to take data and send the data to an amplifier and antenna, which converts the data from electrical signals into electromagnetic radiation. This electromagnetic radiation propagates through the air and is converted from electromagnetic radiation into an electric current (or voltage) by an antenna coupled to a receiver. The electrical signals from the antenna are typically very small and therefore need to be amplified before being sent to a detector for converting the electrical signals into digital information (or the type of information that comprised the source signal).

Accordingly, the receiver converts all the energy that is passed from the antenna into an electrical form and then identifies where the useful information is contained within the energy coupled from the antenna to produce a useful output representative of the input signal. A problem arises if an unintended signal, particularly a strong signal, is coupled into the antenna at the same time as the desired signal. In this case, the unintended signal, if in the frequency spectrum that coincides with the intended signal, will tend to "jam" the radio, thereby reducing reception quality. Furthermore, even if the unintended signal is not coincident in frequency with the desired signal, the unintended signal may nonetheless drive a low noise amplifier, which is typically coupled to the antenna, into a saturation mode. When this low noise amplifier (LNA) is saturated, the gain of the LNA is reduced and the low noise amplifier creates intermodulation products and harmonics. Both effects degrade the reception of the intended signal. Accordingly, in most communication systems it is desired to avoid driving the radio front-ends into saturation by overdriving an amplifier into a non-linear mode of operation.

In narrowband communication systems, one technique for avoiding the saturation of a front end amplifier due to out-of-band radio frequency interference (RFI), is to equip the radio front end with a bandpass characteristic centered around the intended signal, but excluding the unintended RFI. However, such techniques are not suitable if the intended signal is relatively wideband, because the interfering signal has spectra within the spectra of the desired signal. This phenomena happens in a conventional spread spectrum system, much like a CDMA system or other direct sequence spread spectrum system, or even a frequency hopping system.

Another way that a conventional receiver front end can deal with relatively large "in band" interferers is to provide an automatic gain control (AGC), so that the amount of gain in the receiver front-end is reduced, thus avoiding amplifier saturation. However, the problem arises that the RFI may be so high that the difference in magnitudes between the RFI and the desired signal is beyond the dynamic range of the receiver circuitry. Furthermore, AGC cannot affect the signal to interference ratio (SIR) because it affects the two equally.

Another technique for dealing with in-band RFI in broadband communication systems is to first detect and then suppress the RFI. However, such systems usually require a detector to distinguish an interferer from an intended signal and special cancellation circuitry dedicated to the function of "notching" the unintended RFI. Inserting notch filters into the passband creates not only detrimental insertion loss, therefore increasing the noise for the radio front end, but also introduces phase distortion (and corresponding time sidelobes) into the received signal thus limiting the effectiveness of such systems. Furthermore, lower cost systems are usually not adaptive because it is difficult to adjust the center band of the notch frequencies based on the particular interfering signal at any given time.

Spread spectrum communication systems have a predetermined amount of "processing gain," which relates to the amount of redundancy in a transmitted signal. In direct sequence spread spectrum communication systems, this amount of redundancy in the signal, materializes in the form of a much broader bandwidth used to communicate the signal than is necessary if simply the information itself were transmitted (in a "narrowband" modulation format). Accordingly, the receiver applies the despreading code to the received signal to "despread" the signal (i.e. correlate to the desired signal) and suppress the RFI. The RFI is suppressed because the RFI does not coherently combine on a chip-by-chip basis with the spreading code (i.e. it is mostly uncorrelated to the desired signal). More detailed descriptions of spreading techniques and systems for employing spread spectrum communications are provided in "Spread Spectrum Design LPE and AJ Systems," by David L. Nicholson, Computer Science Press, 1987, ISBN0-88175-102-2, the entire contents of which being incorporated herein by reference.

FIG. 1 is a plot of an idealized receiver front end transfer function 10. As can be seen, signals falling in the bandwidth of the receiver front end 10 are coupled into the receiver and processed by receiver. Accordingly, a broadband signal 11, for example, which has frequency components from $f_{lo}$ to $f_{hi}$ are coupled into the receiver front end. However, if other signals are also present such as $RFI_1$ and $RFI_2$, then these larger narrowband signals also have to be processed by the receiver. Accordingly, the receiver components need to have sufficient linearity to handle signals that range from the maximum peak of either interference signals $RFI_1$, or $RFI_2$ to a lowest signal level from an intended signal 11. Furthermore, because $RFI_1$ and $RFI_2$ are "in-band interferers" (meaning that these interferers overlap in frequency with the desired signal 11), the detection circuits also will have to attempt to decode data transmitted in intended signal 11 while in the presence of $RFI_1$ and $RFI_2$. It would be possible to include a notch-filter 12 that would "excise" $RFI_1$ from the received band. However, a problem with this approach is that the notch filter 12 destroys part of the desired signal and will increase the noise effect by having a predetermined amount of insertion loss and will "notch" a certain predetermined amount of signal energy in the excised band.

FIG. 2 is a spectral plot of a spectral power density of various RFI in the Alexandria, Va. area. The RFI components are distributed between 0 and 1 GHz. Selected bands within this portion of the spectral band are noted in FIG. 2. As can be seen, there are a number of large narrowband interference sources that would give rise to in-band, or even out-of-band radio front-end saturation problems. Accordingly, in conventional UWB receivers the high-levels of RFI and large number of RFI sources are an accepted part of the UWB communications band. As will be seen, the present inventors refused to accept the RFI-contaminated band as being an unavoidable feature of the UWB band, and have use devised a radio-front end that cancels RFI prior to (as well as in addition to) despreading operations in the receiver.

FIGS. 3(a) and 3(b) show corresponding frequency-domain and time-domain plots of tones used to characterize a radio front-end frequency response of receivers. For example, in FIG. 3(a), the receiver front end has a relatively flat transfer function which is characterized typically by identifying a magnitude for a particular frequency (e.g. $f_{lo}$) when a tone at that frequency is presented to the device being characterized (in this case a receiver front-end). Thus, the transfer function magnitude shown in FIG. 3(a) can be said to have a relatively flat passband that would pass all frequencies between $f_{lo}$ and $f_{hi}$.

FIG. 3(b) shows a typical sinusoidal signal that would be used to perform spectrum analysis when used to characterize the transfer function of the receiver front end in FIG. 3(a). Typically, a network analyzer is used to apply a particular time waveform (such as a sinusoid as shown) to the device being measured for a predetermined number of cycles at a particular frequency. The amplitude and phase at a particular frequency is measured for a predetermined period of time before the continuous tone signal is changed to another frequency. The set of measurements spanning a range of frequencies characterizes the filter transfer function. A point to be made here is that classical characterization of receiver front ends is performed by way of spectral analysis that presumes a certain persistence in the spectral component of a tone being applied to the device being characterized.

Conventional UWB communication systems transmit energy over a much larger bandwidth than a normal "narrowband," or even a spread-spectrum communication systems' transmission bandwidth. Accordingly, it would be expected that the number of narrowband signals to be encountered by such UWB bands would be relatively high. Examples of such UWB systems include deRosa (U.S. Pat. No. 2,671,896), Robbins (U.S. Pat. No. 3,662,316), Morey (U.S. Pat. No. 3,806,795), Ross et al. (U.S. Pat. No. 5,337,054) and Fullerton et al. (U.S. Pat. No. 5,6777,927).

The challenge, as presently recognized, is to correctly distinguish an intended, transmitted signal at the UWB receiver in the presence of narrowband tones that interfere with the intended signal, while not adversely altering the nature of the intended UWB signal.

SUMMARY OF THE INVENTION

Consistent with the title of this section, only a brief description of selected features of the present invention are presented. A more complete description of all the various facets of the present invention is the subject of this entire document.

An object of the present invention is to provide a UWB receiver front-end that includes an RFI extraction mechanism that suppresses unwanted in-band RFI without adversely affecting the reception of the intended UWB signal.

Another object of the present invention is to provide a UWB radio front end that includes an adaptable RFI extraction mechanism, as well as a method and computer program product for extracting the RFI.

Another object of the present invention is to provide a UWB receiver front end that passes UWB signals, but excises carrier-based modulated signals (i.e. narrowband signals).

Another feature of the present invention is to address the above-identified and other deficiencies of conventional communication systems and methods.

Another feature of the present invention is to address the saturation of an amplifier by a strong interfering signal.

These and other objects are accomplished by way of a receiver front end for a UWB receiver that employs as part of its functions, an RFI nulling filter with an impulse response comprised of a plurality of time-delayed and possibly inverted impulsive waveforms (e.g. derivative of a step function). In order to support the bandwidth of the desired signal, the width of the impulse waveform should be less than the width of a half cycle of the highest frequency (e.g. the frequency point that is 10 dB down from the peak). The time delay is chosen according to two criteria. First, the delay is chosen long enough so that the output of a matched filter receiver, in response to a single received event (or transmitted wavelet), is comprised of one or more peaks, where at least one of these peaks is equal, or nearly equal, to the peak that would have been obtained from a matched filter. Second, the delay is chosen to be short enough so that the narrower bandwidth RFI signal is essentially an unmodulated tone over the duration of the impulse response of the nulling filter.

The first criterion allows the desired UWB signal to be detected at the peak of the receiver's output signal without loss. By no loss we mean that the same peak voltage relative to an ideal matched filter receiver is observed. The phenomena is explained by noting that the operation of the RFI nulling filter can be understood as two waveforms being convolved with each other in time. In the case of the desired signal, the two waveforms are the time domain matched filtered (i.e. compressed) waveform of the desired signal, and the time domain impulse response of the RFI nulling filter. The phenomenon by which there is no loss is due to the fact that the time domain impulse response of the RFI nulling filter is comprised of impulsive terms that are far enough apart that they do not simultaneously interact with the matched filtered (i.e. compressed) desired signal. In other words, only one impulsive term interacts with the desired signal at any particular time. As a result, there is no interference pattern, or no destructive interference to the desired signal. The RFI nulling filter might be thought of as having the effect of adding known resolvable multipath to the channel.

The second criterion allows the RFI signal to be canceled even though it may be in the center spectrum of the desired signal, yet even while the detected peak of the desired signal is maintained with no loss. In other words, the full spectrum of the desired signal is maintained, yet the overlapping spectrum of the narrowband RFI is nulled. RFI cancellation is achieved because narrowband signals, such as the RFI, have a long extent in time and therefore interacts simultaneously with all the impulsive terms in the impulse response of the RFI nulling filter. The inventors recognized that this overlap is in contrast to the UWB signal, which is only present on one term at a time of the RFI nulling filter's impulse response, allowing the filter to operate differently on the two waveforms. The spacing and phases of the impulsive terms are chosen to cause equal in-phase and out-of-phase contributions such that the RFI is canceled. For example, consider an RFI nulling filter with two equal-amplitude and opposite-phase impulsive waveforms spaced exactly one wavelength apart at the center frequency of an RFI signal. In this case as the waveforms convolve with one another, the points on the RFI waveform that strike the two impulsive terms are always at the same voltage (since they are one wavelength apart). Since the two impulsive terms are of opposite phase (e.g. +1 an −1) the RFI sums to zero at all points in the convolution and is therefore canceled. Similarly, for example, consider an RFI nulling filter with two equal-amplitude and in-phase impulsive waveforms separated by ½ wavelength at the center frequency of the RFI signal. In this case when the RFI waveform and filter impulse response convolve with one another, the points on the RFI waveform that strike the two impulsive terms are always at equal but opposite voltages (since they are a half wavelength apart). Since the two impulsive terms are of equal amplitude (e.g. +1 and +1), the RFI sums to zero at all points in the convolution and is therefore canceled. To extend the above examples, these two-term filters may be built for various frequencies and connected in series to form multiple RFI nulls, while continuing to pass the UWB signal. The resulting composite filter would have a plurality of impulsive functions.

While it might appear that applying the RFI nulling filter directly to the desired signal prior to matched filtering would be problematic due to the fact that the desired signal may extend across more than one impulsive term of the RFI nulling filter—indeed it may extend across the entire filter. The inventors, however, recognized that since the convolution operator is communicative, the ordering of the filtering operations is arbitrary. This is important since the simplest programmable receiver requires a sliding correlator structure as opposed to a real-time matched filter.

While several embodiments are disclosed herein, one embodiment would be to include one or more stub circuits in the receiver front end arranged to pass the UWB signal, but cancel an RFI signal. Another embodiment would be to include one or more sub-circuits that include a splitter, one path delayed relative to the other, and one path possibly inverted relative to the other, and the two paths combined in a summer. Another embodiment would include a same sub-circuit, but with an adaptive delay for adapting the null frequency to cancel observed RFI. In order to extend the apparent dynamic range of an amplifier, in another embodiment the stub can be located at a distance away (e.g. to reflect a short circuit at the notch frequency) from the amplifier so as to prevent the amplifier from saturating

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(d) and 4(e) show an embodiment of a receiver front end with an RFI extraction circuit using a transmission line implementation;

FIGS. 6(a) and 6(b) show overlays of narrowband signals that interact with a RFI extraction mechanism according to the present invention;

DETAILED DESCRIPTION OF THE PREFERRED EMBODIMENTS

Figure 1:
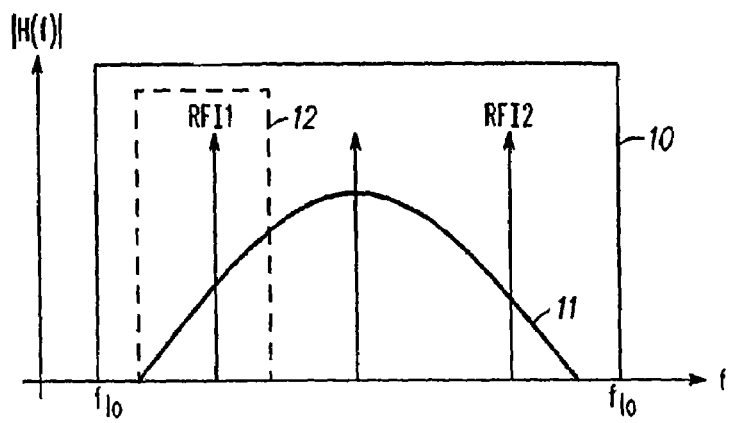
FIG. 1 is a frequency plot for a passband receiver and narrowband and broadband signals that pass by the receiver front end.
Figure 2:
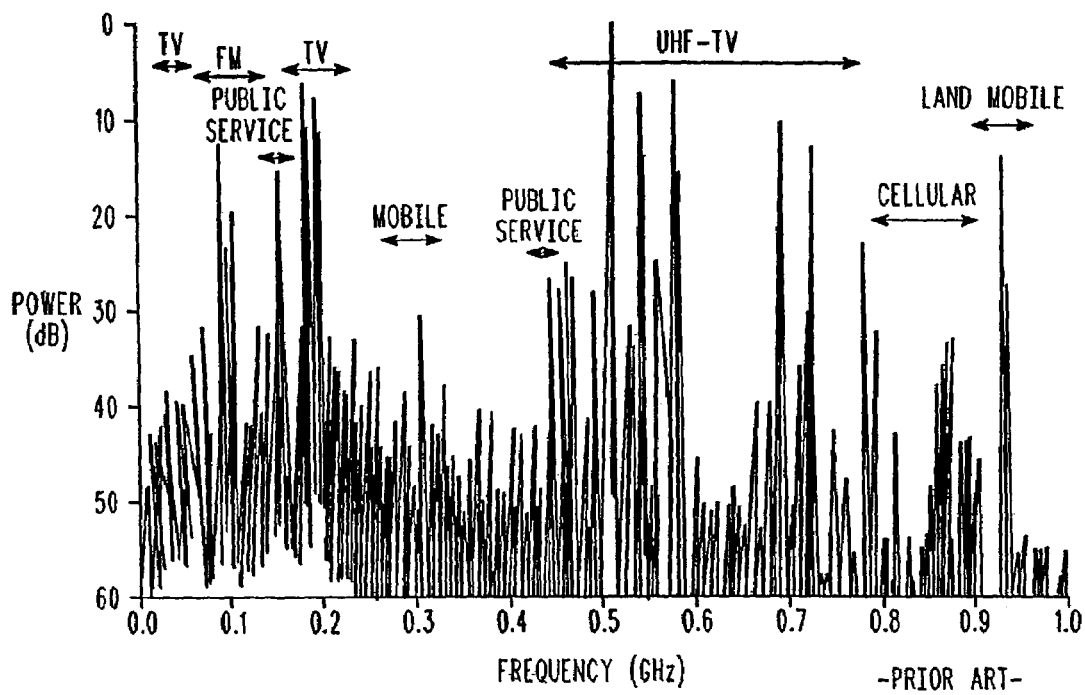
FIG. 2 is a power spectral density plot of radio frequency interference in a particular geographic location.
Figure 3A:
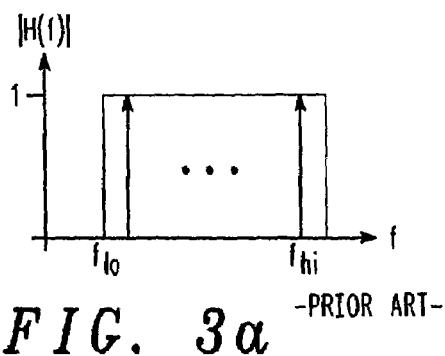
FIGS. 3(a) and 3(b) show a transfer function and corresponding signal used to measure the transfer function according to conventional network analyzer practice.
Figure 3B:
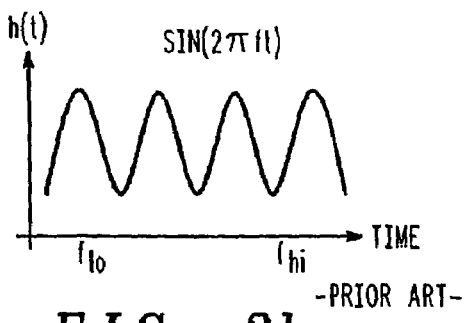
Figure 4A:
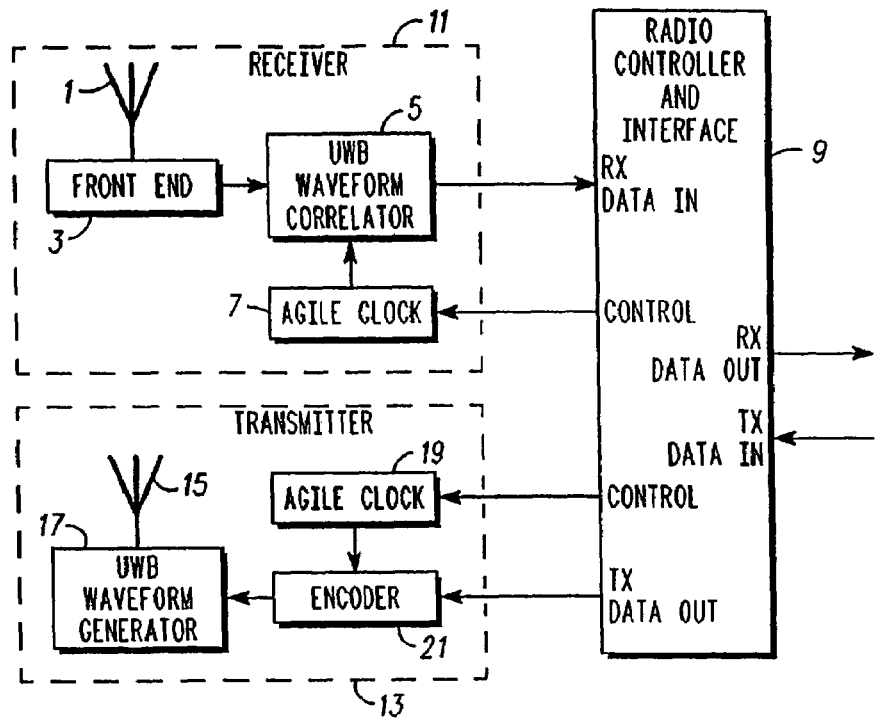
FIGS. 4(A)-4(C) are block diagrams of a UWB transmitter and receiver according to the present invention.

Referring now to the drawings, FIG. 4a is a block diagram of an ultra-wide band (UWB) transceiver. In FIG. 4a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, ..., +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), ..., exp(+j(N−1)/N), exp(−jπ(N−1)/N)), (v) multilevel multi-phase signals ($a_i$ exp(j2πβ/N)|$a_i \in \{1, a1, a2, ..., aK\}$, $\beta \in \{0, 1, ..., N−1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, ..., M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \qquad (1)$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \qquad (2)$$

In the above equation, function $f$ defines a basic wavelet shape, and function h is simply the Hilbert transform of the function $f$. The parameter $B_{i,1}$ is a complex number allowing the magnitude and phase of each wavelet pulse to be adjusted, i.e., $B_{i,1} = a_i \angle \theta_i$, where $a_i$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes $f$ that are derivatives of a Gaussian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \qquad (3)$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes $f$ that are Gaussian weighted sinusoidal functions, as described by Equation 4 below.

$$f_{B_{i,2}, B_{i,3}, B_{i,4}} = f_{\omega_i, k_i, b_i}(t) = e^{-[b_i t]^2} \sin(\omega_i t + k_i t^2). \qquad (4)$$

In the above equation, $b_i$ controls the pulse duration, $a$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes $f$ that are inverse-exponentially weighted sinusoidal functions, as described by Equation 5 below.

$$g_{B_i}(t) = \left( \frac{1}{e^{\frac{-(t-t1_i)}{.3 * tr_i}} + 1} - \frac{1}{e^{\frac{-(t-t2_i)}{.3 * tf_i}} + 1} \right) \cdot \sin(\theta_i + \omega_i t + k_i t^2) \qquad (5)$$

where $$\{B_{i,2}, B_{i,3}, B_{i,4}, B_{i,5}, B_{i,6}, B_{i,7}, B_{i,8}\} = \{t1_i, t2_i, tr_i, tf_i, \theta_i, \omega_i, k_i\}$$

In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega=1$, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25 f_c$ and toward $2f_c$. A key attribute of the exemplary wavelets (or e.g., those described in co-pending U.S. patent application Ser. No. 09/209,460) is that the parameters are chosen such that neither f nor h in Equation 2 above has a DC component, yet f and h exhibit the required wide relative bandwidth for UWB systems.

Similarly, as a result of $B > 0.25 f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Referring back to FIG. 4a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 4b, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 4C:
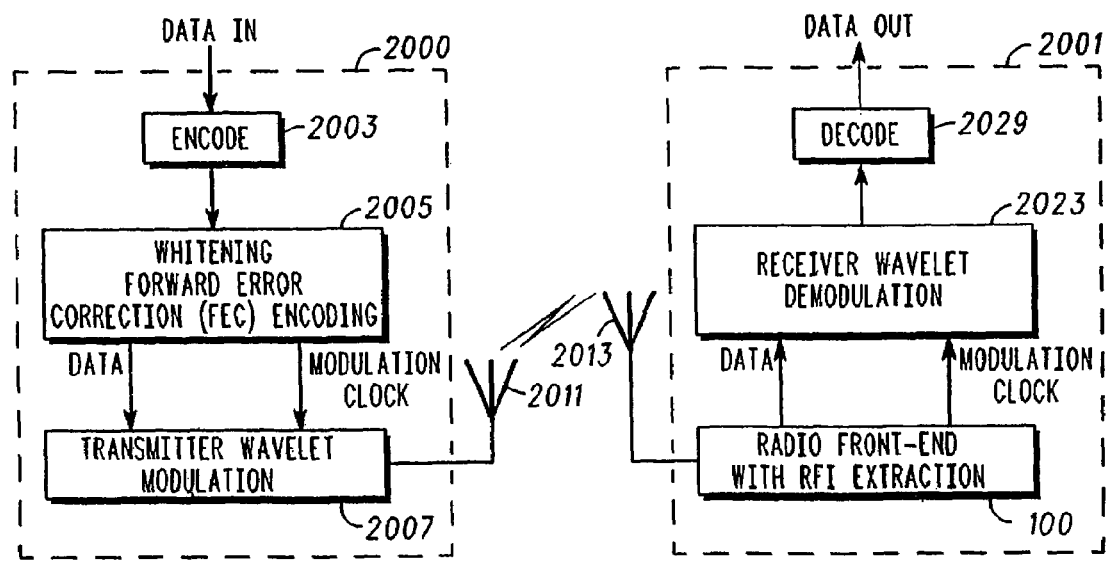
Figure 4B:
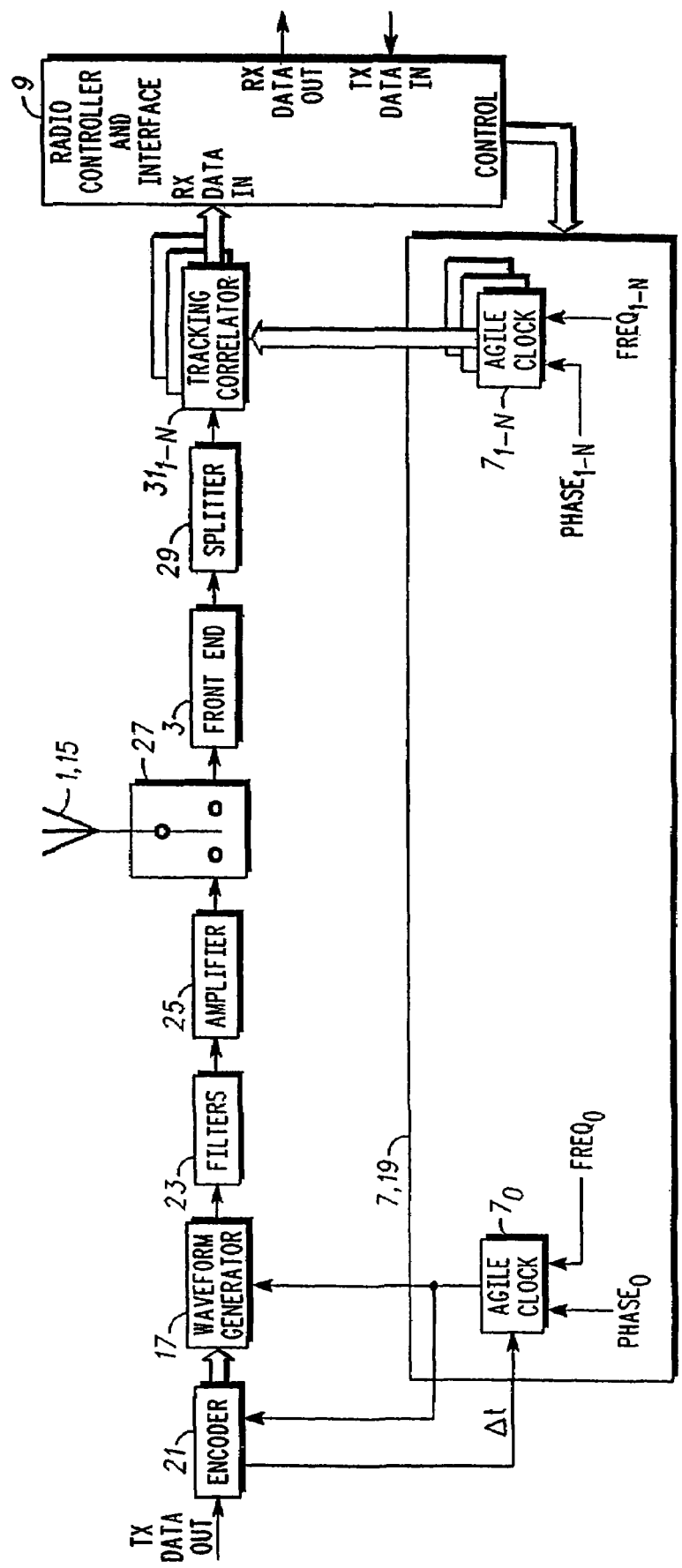

FIG. 4b is a block diagram of a transceiver embodiment of the present invention in which the modulation scheme employed is able to manipulate the shape and time of the UWB pulses. In FIG. 4b, when receiving energy through the antenna 1, 15 (e.g., corresponding antennas 1 and 15 of FIG. 4a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$-$31_N$. Each of the tracking correlators $31_1$-$31_N$ receives a clock input signal from a respective timing generator $7_1$-$7_N$ of a timing generator module 7, 19, as shown in FIG. 4b.

The timing generators $7_1$-$7_N$, for example, receive a phase and frequency adjustment signal, as shown in FIG. 4b, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$-$31_N$ (corresponding to the UWB waveform correlator 5 of FIG. 4a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$-$7_N$, so that each receiver can recover the signal delayed by different amounts, such as the delays caused by multipath (i.e., scattering along different paths via reflecting off of local objects).

A feature of the transceiver in FIG. 4b is that it includes a plurality of tracking correlators $31_1$-$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$-$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 4b, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., Δt) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

FIG. 4(c) shows a transmitter and receiver for an ultra wide band (UWB) communication system according to the present invention. At transmitter 2000, data is received and encoded through an encoder 2003 so as to reduce source redundancy in the data. Whitening, i.e., scrambling, is applied to the data, along with forward error correction coding in encoder 2005. Any one of a variety of FEC scheme may be used, such as those described in "Error Control Coding: Fundamentals and Applications," by Lin, S., et al., Prentice-Hall Inc., 1983, ISBN 0-13-283796-X, the entire contents of which being incorporated herein by reference. The encoded data is then sent with a modulation clock to a transmitter wavelet modulator 2007, which produces an ultra wide band (UWB) time modulated signal unique to a particular user. The signal is then electromagnetically launched via antenna 2011.

Energy transmitted over the UWB channel is then received in antenna 2013 at receiver 2001. Receiver 2001 includes a radio front end having a RFI extraction mechanism 100, discussed in more detail below. The received signal after the RFI has been canceled is sent to a receiver wavelet demodulator 2023 along with a modulation clock. The received signal is then demodulated with demodulator 2023, then decoded in decoder 2029 and subsequently output through an output port.

It is helpful to recognize symbols of a UWB signal, according to the present invention, are punctuated in time after matched filtering—there are not multiple sinusoidal cycles for a particular transmitted symbol. This is a relevant observation since conventional understanding of how filters, impulse responses and transfer functions of devices operate is based on the presumption of continuous-time, "persistent" channel symbols. The present invention, on the other hand, is based on discrete wavelets transmitted for short periods of time, such as 500 ps and are not repeated over multiple cycles of a narrowband sinusoid. Thus, it is the shape and relative time position for groups of these pulses, which contain the data, not in a continuous wave representation of a continuous-time signal. The significance of this point can be illustrated with the example of a finite impulse response (FIR) filter. Such filters use multiple tap points, to provide delayed versions of an input signal to combine with other parts of the signal, although delayed in time. Such filters require that there be a certain persistence to the signal—if there were no persistence, there would be no part of the main signal to be combined with the "feed-forward," (or feed back) signals.

However, as presently recognized, such conventional filter analysis is inappropriate in a UWB system that employs wavelets which result in single-cycle-like outputs from a matched filter as a basis set for channel symbols. To illustrate this purposeful lack of persistence feature, suppose a 500 ps peak-to-peak single-cycle wavelet (e.g. $te^{-(\alpha t)^2}$) is input to a front end of a receiver that has multiple tap points spaced by 2 ns. This one wavelet will pass through the circuit, and copies of which will be sent to multiple tap points for later combination with the signal. However, these delayed versions of the pulse will never be combined with another part of the signal because the signal is not persistent. Accordingly, the use of such filtering models can lead to unexpected results for UWB transmission schemes according to the present invention.

FIG. 4(d) is one implementation of an RFI extraction mechanism, according to the present invention. The RFI extraction mechanism includes a low noise amplifier 110 that receives a signal from an antenna 100. The amplifier 110 then provides an output impedance of 50 Ω to drive a 50 Ω transmission line 150. A 25 Ω transmission line stub 130 is connected to the 50 Ω transmission line 150 on one end thereof and connected to a node held at a predetermined potential (in this implementation, ground so as to produce a short circuit) on the other end thereof. Another 50 Ω transmission line 170 connects to the 50 Ω transmission line 150 and stub 130 as shown. Thus, the 50 Ω transmission line 170 feeds a composite signal from the 50 Ω transmission line 150 and 25 Ω stub 130 in aggregate. Amplifier 120 then amplifies the combined signal and produces an output signal that is free of RFI at particular frequencies. Additional circuits may be cascaded to implement multi-null notch filters. Furthermore, the distance between the output of amplifier 110 and 25 Ω transmission line 130, can be chosen to optimize the dynamic range of the RFI extraction mechanism in the presence of large signals at the notch frequency. The distance is chosen to reflect, for example, a short-circuit at an internal node of amplifier 110 so that it is prevented from saturating.

Regarding a signal flow through the RFI excision mechanism according to FIG. 4(d), a pulse 200 for example is applied from the antenna 100 to the low noise amplifier 110 as shown. This single pulse then will be amplified by the amplifier 110, passed through the line 150, and a first version of which (undelayed) pulse would pass on 50 Ω transmission line 170 to amplifier 120 directly. However, a copy of the incoming pulse 200 would propagate down transmission line 130, which has a length that is a half wavelength of the RFI frequency component so as to impart a delay of 360°. Having a stub length of this length ensures complete inverting reflection, such that an inverted signal is passed up to 50 Ω transmission line 170 from the stub 130 where the pulse is an inverted pulse and time shifted 360° (or 2τ) from the undelayed pulse previously passed directly from the 50 Ω line 150 to the 50 Ω line 170. As a consequence, the resulting impulse characteristic 210 of the radio frequency extraction circuit includes a first pulse that mimics that of the received pulse, and then the inverted pulse that is delayed in time.

FIG. 4(e) is another implementation, similar to FIG. 4(d), of the RFI extraction mechanism, wherein the stub is configured to produce an open circuit. Thus, the delayed version of the incoming pulse 200 is time shifted 2τ, but is not inverted so as to create the impulse response 212. Also similar to the description of FIG. 4(d), the distance between the output of amplifier 110 and 25 Ω transmission line 130, can be chosen to optimize the dynamic range of the RFI extraction mechanism in the presence of large signals at the notch frequency. The distance is chosen to reflect, for example, a short-circuit at an internal node of amplifier 110 so that it is prevented from saturating.

Figure 5A:
FIGS. 5(a)-5(d) show different impulse responses that may be created using the transmission line implementation according to the present invention or other implementations.
Figure 5B:
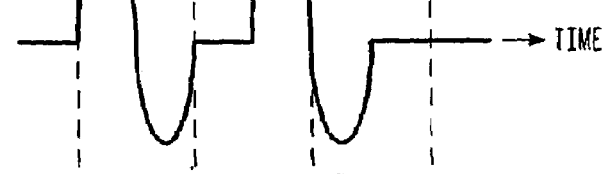

FIGS. 5(a)-5(d) show different exemplary embodiments of receiver impulse functions (in the present single bi-phase wavelet embodiment) that may be implemented according to the present invention in order to extract radio frequency interference from the received signal. FIG. 5(a) shows an impulse response of a receiver front end that passes a first bi-phase wavelet, and then also passes another bi-phase wavelet delayed by one half of a time period of the bi-phase wavelet. FIG. 5(b) is similar to FIG. 5(a), although the inverted bi-phase wavelets characterize the impulse response rather than the wavelets shown in FIG. 5(a). The two inverted bi-phase wavelets of FIG. 5(b) are also delayed in time by one half of the time period T of the bi-phase wavelet as shown.

Figure 5C:
Figure 5D:
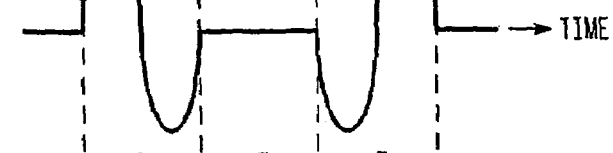

FIGS. 5(c) and 5(d) show impulse responses of front ends that include shapes of bi-phase wavelets that are separated by wavelet duration T, and inverted inside.

FIG. 6(a) shows a time waveform of a narrowband RFI signal 260 that interacts with the radio frequency extraction mechanism having the impulse response 230 as shown in FIG. 5(b). As seen, although the radio frequency extraction mechanism will pass a first cycle T of the narrowband RFI signal, but also passes a 180° out of phase portion of the same signal during the last portion of the second cycle and the first portion of the third cycle as shown. Accordingly, the composite energy passed to the amplifier is 0 volts, thereby completely canceling the narrowband RFI signal.

The time domain graph of FIG. 6(b) shows how the radio frequency extraction mechanism having an impulse response like that in FIG. 5(d) deals with the narrowband interfering signal. As seen, while an entire first period of the narrowband signal is passed, a complete third cycle of the same narrowband interfere is added 180° at a phase with a first cycle, thereby providing a 0 volt signal to the output amplifier.

In contrast to the time-persistent narrowband RFI signal, a UWB signal is employed in the present invention and has wavelet components that mirror the respective subcomponents of the impulse response of the radio front end, so the UWB wavelets pass through the radio front end unscathed. Accordingly, using the RFI cancellation mechanism according to the present invention allows UWB bi-phase wavelet signals to pass unscathed, while in-band narrowband RFI signals are canceled quite effectively. Experimental results by the present inventors indicate that the radio that employs the RFI mechanism according to the present invention is able to operate successfully even though a cellular phone user while transmitting may be located directly next to the UWB receive antenna 2013 (FIG. 4A) for the UWB receiver.

Figure 7A:
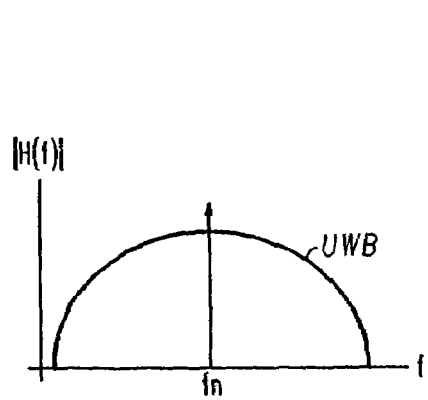
FIGS. 7(a) and 7(b) are spectral plots of a signal before and after the signal passes through the RFI extraction mechanism according to the present invention.
Figure 7B:
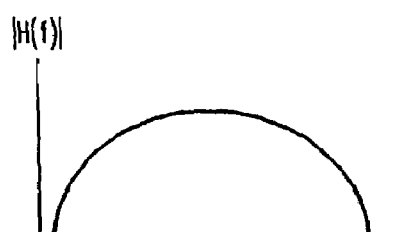
Figure 7C:
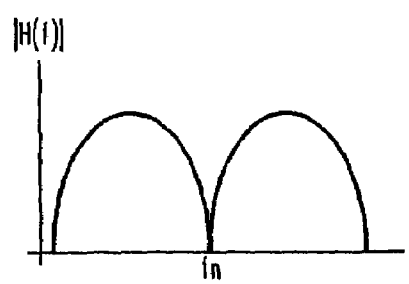
FIG. 7(c) is a spectral plot of a signal after the signal passes through a receiver front end according to conventional RFI extraction practice.

According to conventional frequency analysis performed with a network analyzer, FIGS. 7(a) and 7(b) show the net effect of a transfer function for the radio front end RFI extraction mechanism according to the present invention when exposed to UWB signals according to the present invention when in the presence of narrowband RFI. FIG. 7(a) shows narrowband interference $f_n$ that is present within the spectrum occupied by a UWB signal. FIG. 7(b) shows how the RFI extraction mechanism according to the present invention blocks the RFI tone $f_n$, yet inspection of one of the output terms, such as the first cycle in FIG. 5(d), shows that it has all the original frequency components. In a conventional spectral analysis, the bandpass characteristics of the RFI extraction mechanism would appear to have a "notch" centered at $f_n$, thus creating a discontinuity in the receive band as shown in FIG. 7(c). However, because the wavelet-based UWB signals according to the present invention pass unscathed through the RFI extraction mechanism, the spectrum as seen by a time-confined output event, depicted in FIG. 7(b) is undisturbed.

Figure 8A:
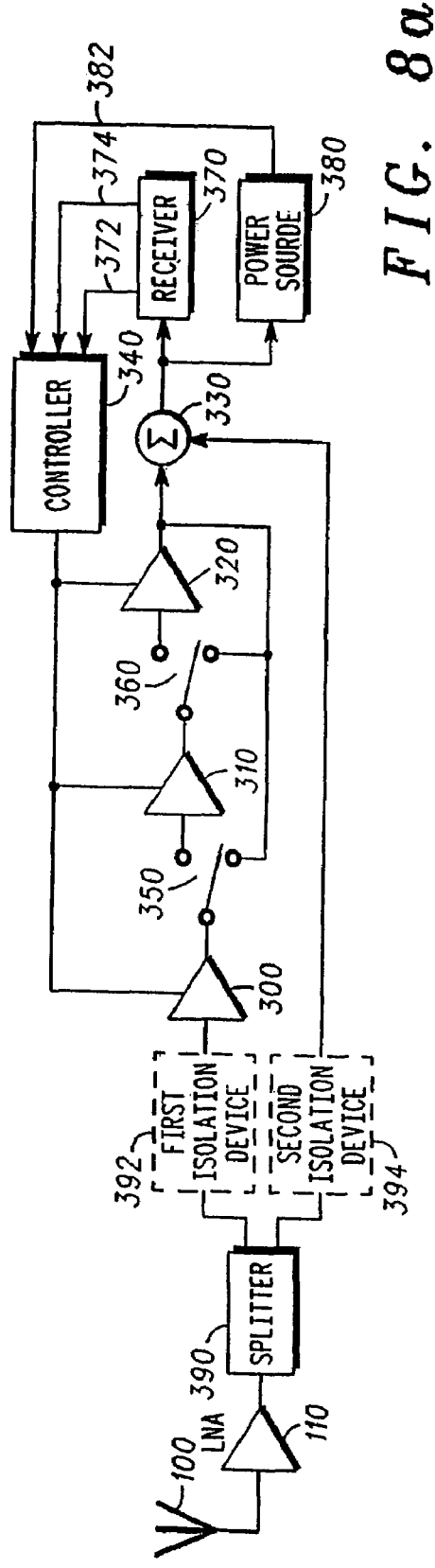
FIGS. 8(A) and 8(B) show an adaptive RFI extraction mechanism and corresponding time plot according to the present invention.
Figure 8C:
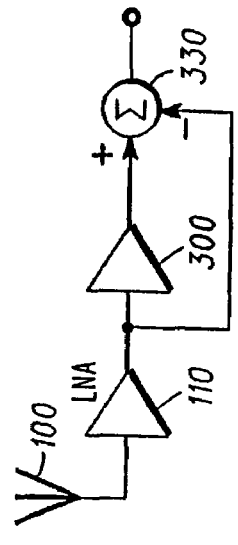
FIG. 8(C) shows a fixed RFI extraction mechanism.
Figure 8D:
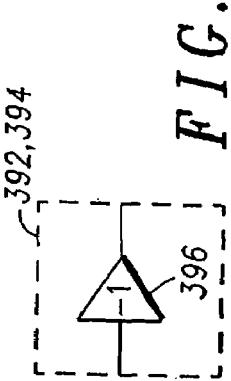
FIG. 8D shows a preferred embodiment of the isolation devices of FIG. 8A.
Figure 8B:
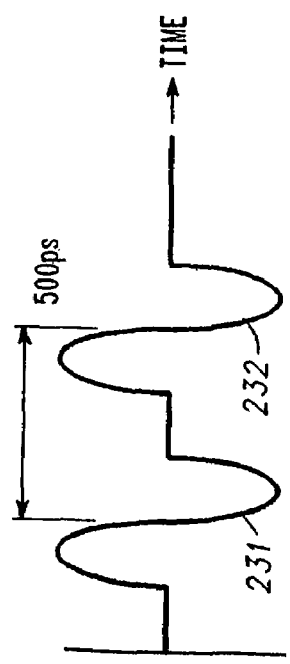

FIGS. 8(A) and 8(B) show alternative embodiments to the RFI extraction mechanism according to the present invention. As can be seen, the antenna 100 provides a low noise amplifier 110 with a signal that is both subject to the intended UWB signal, as well as narrowband RFI. However, the RFI extraction embodiment of FIG. 8(A) includes a controllable RFI extraction mechanism such that the nature and content of the RFI may be sensed by way of receiver 370 and power sensor 380 and are fed to a controller 340, for controlling the relative position of the impulse response components (elements 231 and 232 of FIG. 8(B)). The processor-based controller 340 is programmed to control the relative position and orientation of a first impulse response component 231 in FIG. 8(B) and a second impulse response component 232.

First impulse response component 231 is formed at a first input terminal of summer 330 (which is shown to be negative, but may also be a positive input). The second impulse response component 232 is formed at the other input to the summer 330, which is influenced by the controller 340. The controller 340 adjusts a bias on the respective amplifiers 300, 310 and 320, where the level of the bias adjusts the amount of delay through the amplifier chain 300, 310 and 320. As an alternative embodiment, the controller 340 may not adjust the bias, but rather switch the process flow from the respective amplifiers 300, 310, 320, so that some of the amplifiers are bypassed. Switching-in and switching-out some of the amplifiers alters the amount of relative delay in the second impulse response component 232 with regard to the first impulse response component 231. Furthermore, the controller 340 may use a combination of adjusting the bias on the amplifiers 300, 310 and 320, and asserting control of switches 350 and 360.

The circuit preferably includes a two-way splitter 390 that splits the signal from the LNA 110, providing one split signal to the input of the first amplifier 300, and one input to the first input of the summer 330. In alternate embodiments, a first isolation device 392 may be used between the first amplifier 300 and the two-way splitter 390, and/or a second isolation device 394 may be used between the summer 330 and the two-way splitter 390. As shown in FIG. 8D, each isolation device 392, 394 may include an inverting amplifier 396.

Figure 16A:
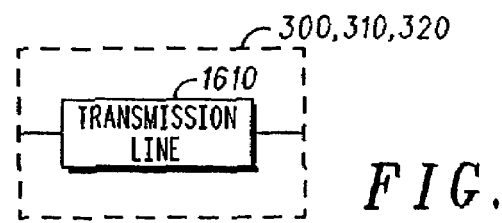
FIGS. 16A through 16C show preferred embodiments of the amplifiers in FIG. 8A.
Figure 16B:
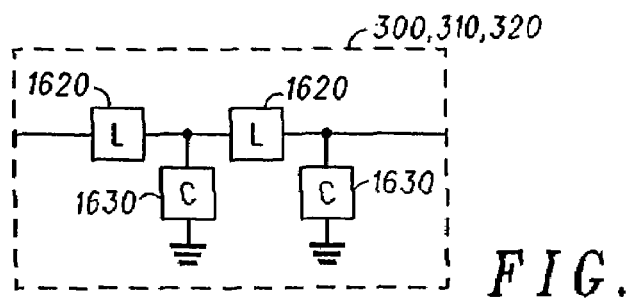
Figure 16C:
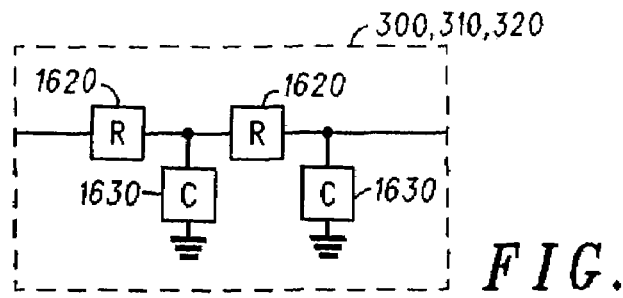

As shown in FIGS. 16A-16C, the amplifiers 300, 310, and 320 can each comprise a transmission line 1610 (as shown in FIG. 16A), a series of series inductor (L) sections 1620 and shunt capacitor (C) sections 1630 (as shown in FIG. 16B), or a series of series resistor (R) sections 1640 and shunt capacitor (C) sections 1630 (as shown in FIG. 16C). In some embodiments, one or more of the shunt capacitor sections 1630 can be electrically adjustable, such as a varactor.

The receiver 370, in one embodiment, detects the signal energy level of the largest RFI signal and the signal-to-noise ratio (SNR) of that RFI signal. The power sensor 380 senses the output power from the summer 330, in an attempt to isolate the most problematic RFI. The controller 340, operates in two modes. In one mode, the controller sweeps the notch frequency and settles at the frequencies that provides the lowest energy as registered by power sensor 380. In the second mode, the controller determine the frequencies containing the most energy, and then sets the notch frequencies accordingly. Predetermined values in a memory table are often required to adjust the bias on the respective amplifiers, and/or the respective delays by asserting control over switches 350 and 360, due to non-linear mapping of bias to notch-frequency. In this way, the controller 340 adjusts the relative spacing of the first element 231 and second element 232 (FIG. 8(B)) so that the impulse response of the RFI extraction mechanism will cancel the predominant RFI. As an alternative, the controller 340 may attempt to optimize the reception quality by using the detection quality metrics such as proportional to the bit error rate (BER), for example, as described in co-pending application Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM.

FIG. 8(C) is a block diagram of another embodiment that is similar to the embodiment shown in FIG. 8(A). A difference, however, is that the amplifier 300 has a fixed delay. As shown in FIG. 8(B), the first component 231 is formed at a first input terminal of summer 330, and the second impulse response component 232 is formed at the other input to the summer 330. The amount of separation between the two components is set by a fixed delay through amplifier 300.

Figure 9:
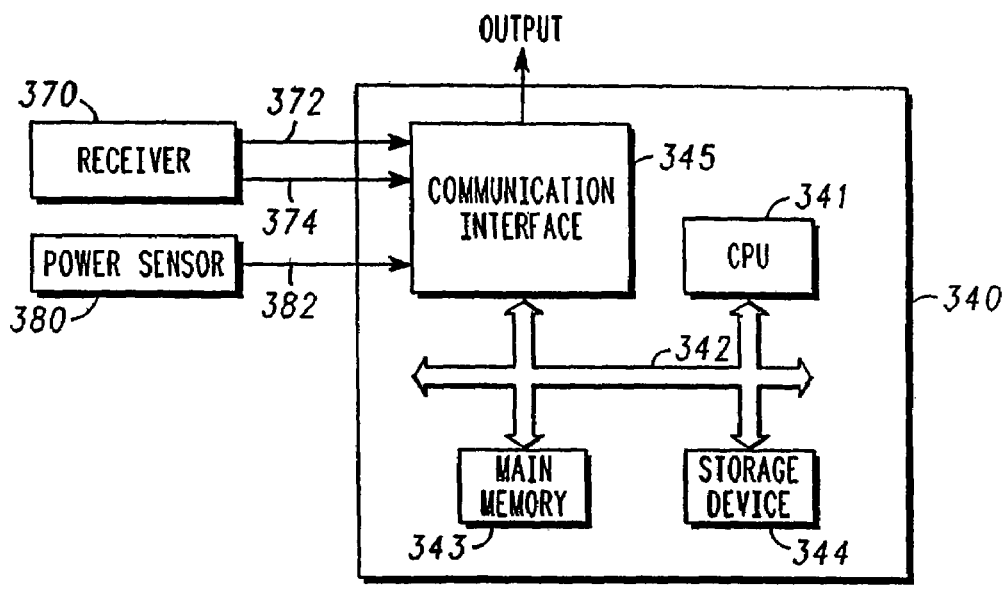
FIG. 9 is a block diagram of a RFI extraction embodiment that employs a controller for providing a tunable active stub RFI extraction circuit according to the present invention.

FIG. 9 shows an embodiment of the controller 340 of FIG. 8(A). The controller 340 includes a CPU 341 that communicates with other components in the controller by way of a bus 342. The bus 342 interconnects a main memory 343, which may be a random access memory (RAM) or other dynamic storage devices (e.g. dynamic RAM (DRAM), static RAM (SRAM), and synchronous DRAM (SDRAM)) holding different values, such as bias values or switch settings for given frequency inputs. A storage device 344, which may be a semiconductor memory, magnetic hard disk or a removable media drive (e.g. a floppy disk drive, a read-only compact disc drive, a read/write compact disc drive, a compact disc jukebox, a tape drive, and a removable magneto-optical drive), is also included so that different identification and control processes may be loaded into the CPU 341, for identifying the different RFI values to be extracted. This may occur if the best, optimum, technique for canceling RFI is not to select the largest RFI within the band, but perhaps one within a certain sector of the band. The bus 342 also interconnects the CPU 341 with a communications interface 345 that receives information from the receiver 370 and the power sensor 380 and also provides the output signal. The communications interface 345 may be a discrete line, or also conventional IO port, such as a parallel port, serial port, or merely a local-bus or control line.

Figure 10:
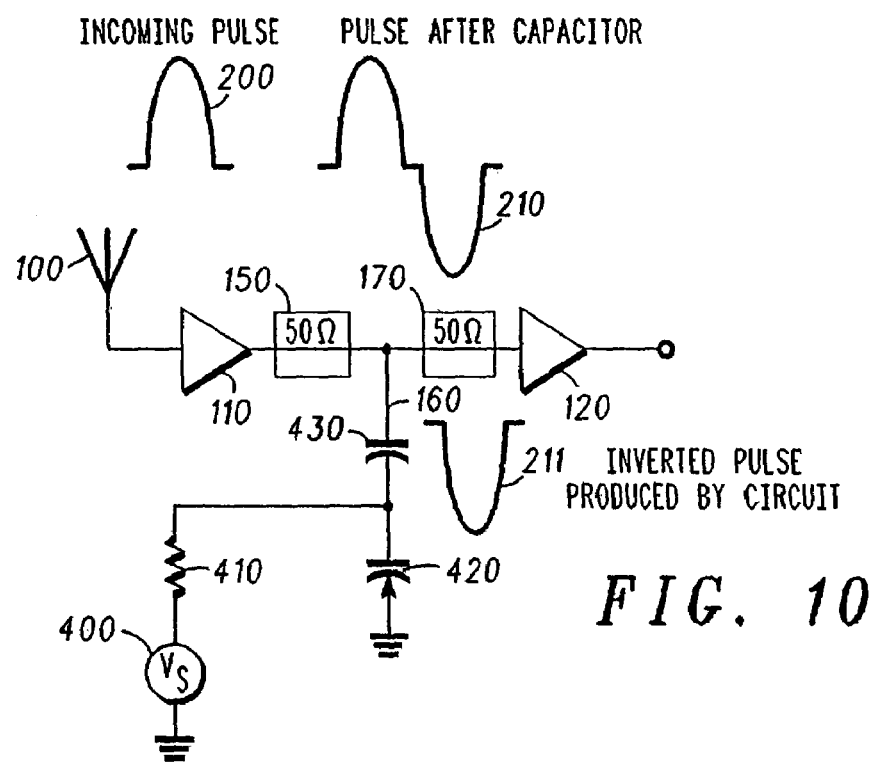
FIG. 10 is a block diagram of a RFI extraction embodiment of an adaptive RFI extraction mechanism according to the present invention that employs a variable capacitor and voltage controllable source.

FIG. 10 shows another-embodiment of the present invention that is similar to the embodiment shown in FIGS. 4(A) and 4(C), although also includes a fixed voltage capacitor 430, a voltage controllable capacitor 420, a resistor 410, and a controlling voltage source 400 for adjusting the amounts of delay introduced by the stub 160. The voltage source 400 will apply an adjustable voltage (perhaps under manual control or through the controller shown in FIG. 9, for example), so as to adjust an amount of capacitance exhibited by the voltage variable capacitor 420. In this way, the amount of delay imparted by the stub 160 is controllable.

Figure 11:
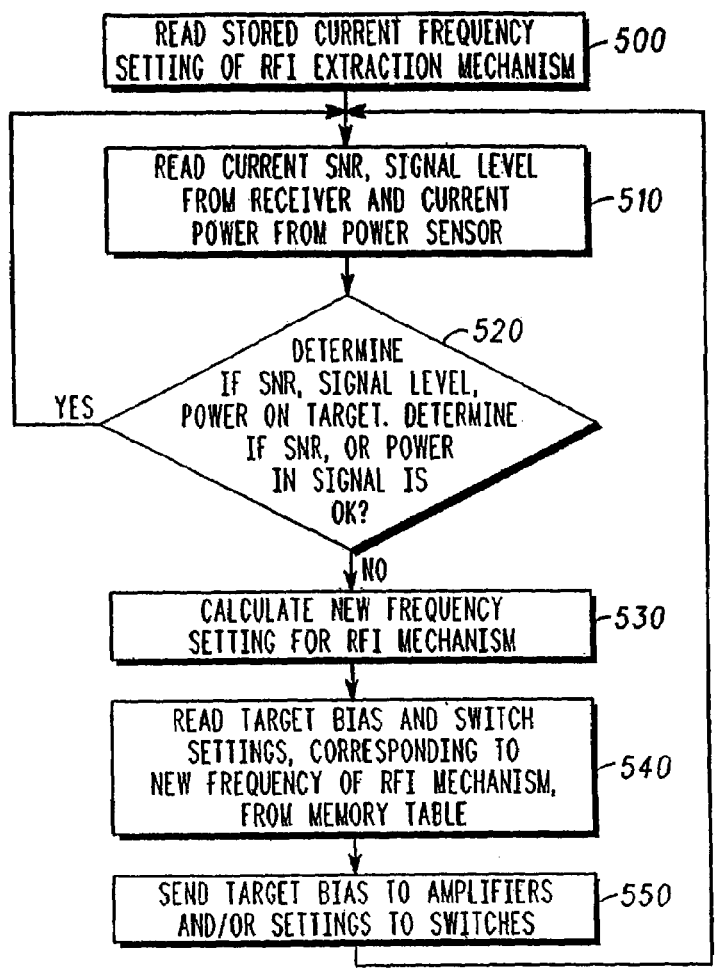
FIG. 11 is a flow chart outlining the general steps performed by the controller shown in FIGS. 8(A) and 9.

FIG. 11 is a flow chart describing the steps performed by the controller 340 shown in FIGS. 8(A) and 9. In step 500, CPU 341 reads the current frequency setting of the RFI extraction mechanism from main memory 343. In step 510 the controller receives SNR 372 and signal energy level 374 from the receiver 370 and power level 382 from the power sensor 380 through the communication interface 345. The process then proceeds to step 520 where an inquiry is made by the CPU 341 to determine whether SNR, signal level, and power are on target, i.e. at levels whereby the RFI narrowband tones have been sufficiently canceled, as indicated by their values.

If the response to the inquiry in step 520 is negative, a new frequency setting is calculated by CPU 341 in step 530 then stored in main memory 343. Then, a memory table in main memory 343 is accessed in step 540 by CPU 341 to read the target bias to amplifiers 300, 310, and 320 and the target position of switches 350 and 360 corresponding to the frequency setting. In step 550, the target bias is sent to the amplifiers 300, 310 and 320 through the communication interface 345 and/or the target switch settings are sent to switches 350 and 360. Steps 510-550 are repeated until SNR, signal level, and power are on target. Thus, the controller 340 adjusts the bias and/or switch settings in order to adjust the relative spacing of first element 231 and second element 232 (FIG. 8($b$)).

If the response to the inquiry in step 520 is affirmative, meaning that the SNR, signal level, and power are on target, and the RFI narrowband tone has been canceled, the controller repeats steps 510 and 520.

Figure 12:
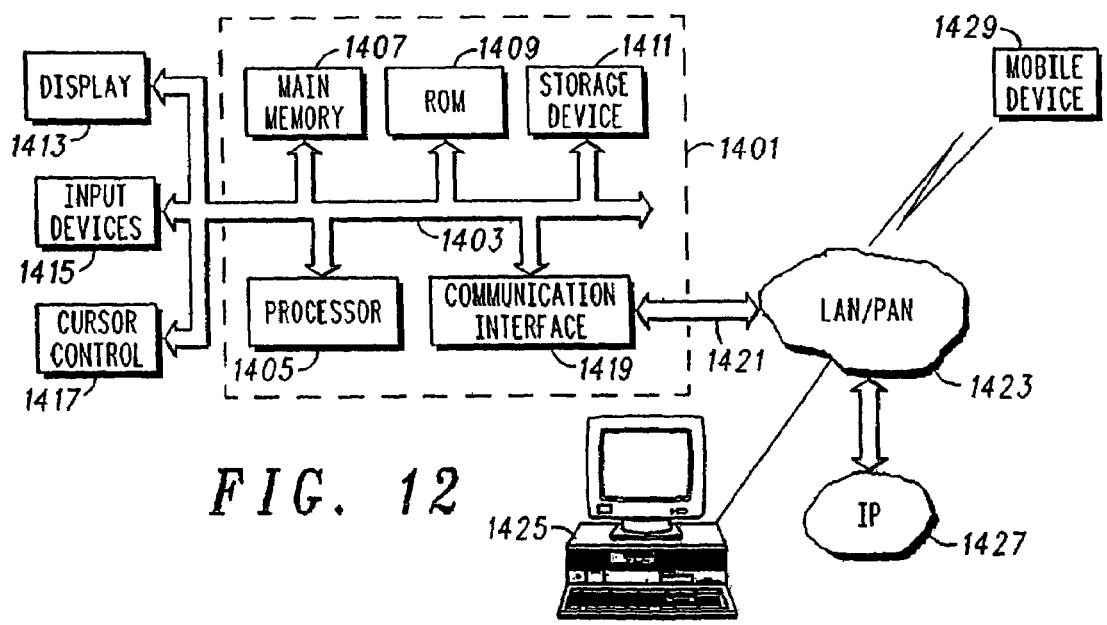
FIG. 12 is a block diagram of one particular implementation and use for the RFI extraction mechanism when used in a communication setting according to the present invention.

FIG. 12 is a block diagram of a system that may employ a UWB communication system with RFI extraction mechanism according to the present invention. In particular, a digital device 1401 is used to communicate in a LAN/PAN 1423 by way of communication interface 1421. The digital device 1401 operates in the presence of mobile device 1429, computer 1425 and other devices that connect via an Internet protocol 1427 network to the LAN/PAN 1423. Thus, these other devices may create high amounts of narrow band RFI thus causing disturbance to the device 1401. The device 1401 is shown using a bus 1403 to interconnect a main memory 1407, ROM 1409 and storage device 1411 all of which are used to hold application software, as well as temporary message and variable data. The communication interface 1419 also communicates to the other devices on the bus 1403 as well as provides a wireless interface 1421 to the LAN/PAN 1423. A processor 1405 performs the control operations for the device 1401. External interface devices including the display 1413, input devices 1415 such as pointer devices and cursor control devices 1417 are used to affect the processes performed on the processor 1405 and connect to the processor 1405 by way of the bus 1403.

Figure 13:
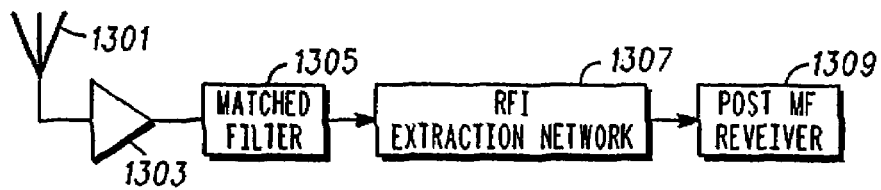
FIG. 13 is a block diagram that shows an RFI extraction network included in the receiver architecture after a match filter.

FIG. 13 is a block diagram of a receiver that employs the RFI extraction network 1307 according to the present invention. As shown in FIG. 13, the antenna 1301 receives UWB signals that are corrupted by RFI and passes the signals through a low noise amplifier 1303. The UWB signals as well as the RFI are passed through a matched filter 1305 so as to "compress" the UWB wavelets. The UWB wavelets are then passed through the RFI extraction network 1307, which may be implemented according to any one of the different embodiments previously described. Furthermore, the RFI extraction network 1307 may also include a cascaded series of RFI extraction circuits, each configured to suppress a different frequency. Therefore, the RFI extraction network 1307 may take on any one of a number of "notch" attributes for a given filtering operation. Separate notch devices would be used to suppress different detected or known narrow band interference sources. This detection and extraction may be fixed by predefined design parameters, or made to be self-adapting through the use of feedback where filter characteristics are set to provide a minimum output power. When set to provide minimum output power, it is presumed the UWB signal was present in a high interface-to-signal environment. The output of the RFI extraction network 1307 is provided to a post matched filter receiver 1309 for subsequent processing.

Figure 14:
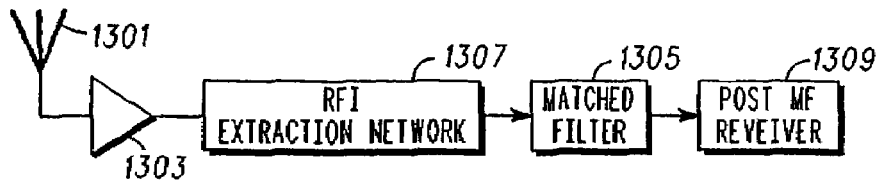
FIG. 14 is a block diagram that shows the use of a matched filter after the RFI extraction network in a UWB receiver system.

The present inventors recognized that, in the frequency domain, the matched filter operation involves a multiplication with the received UWB spectrum. In the frequency domain, the output of the matched filter is given by H(W)=G(w)·G*(w). Thus in the frequency domain, the matched filter operation is a multiplication of the frequency representation of the wavelet (G(w)) multiplied by the matched filter operator (G*(w)). Because multiplication is a commutative process, the location of the matched filter 1305 may be placed either before the RFI extraction network 1307 or after the RFI extraction network 1307 as shown in FIG. 14.

The RFI extraction mechanism according to the present invention is most effective when the time delay between the components of the network transfer characteristic (see the network characteristic of FIG. 4A) are ideally greater than twice the time occupied by the main component of the compressed waveform (after match filter). However, even if the delay is about the same time (i.e., less than twice) as the main component of the compressed waveform (where the main component of the compressed waveform is defined as the 6 dB down points relative to the peak of the envelope of the compressed wavelet) the performance is still improved because more interference is suppressed than signal.

Figure 15:
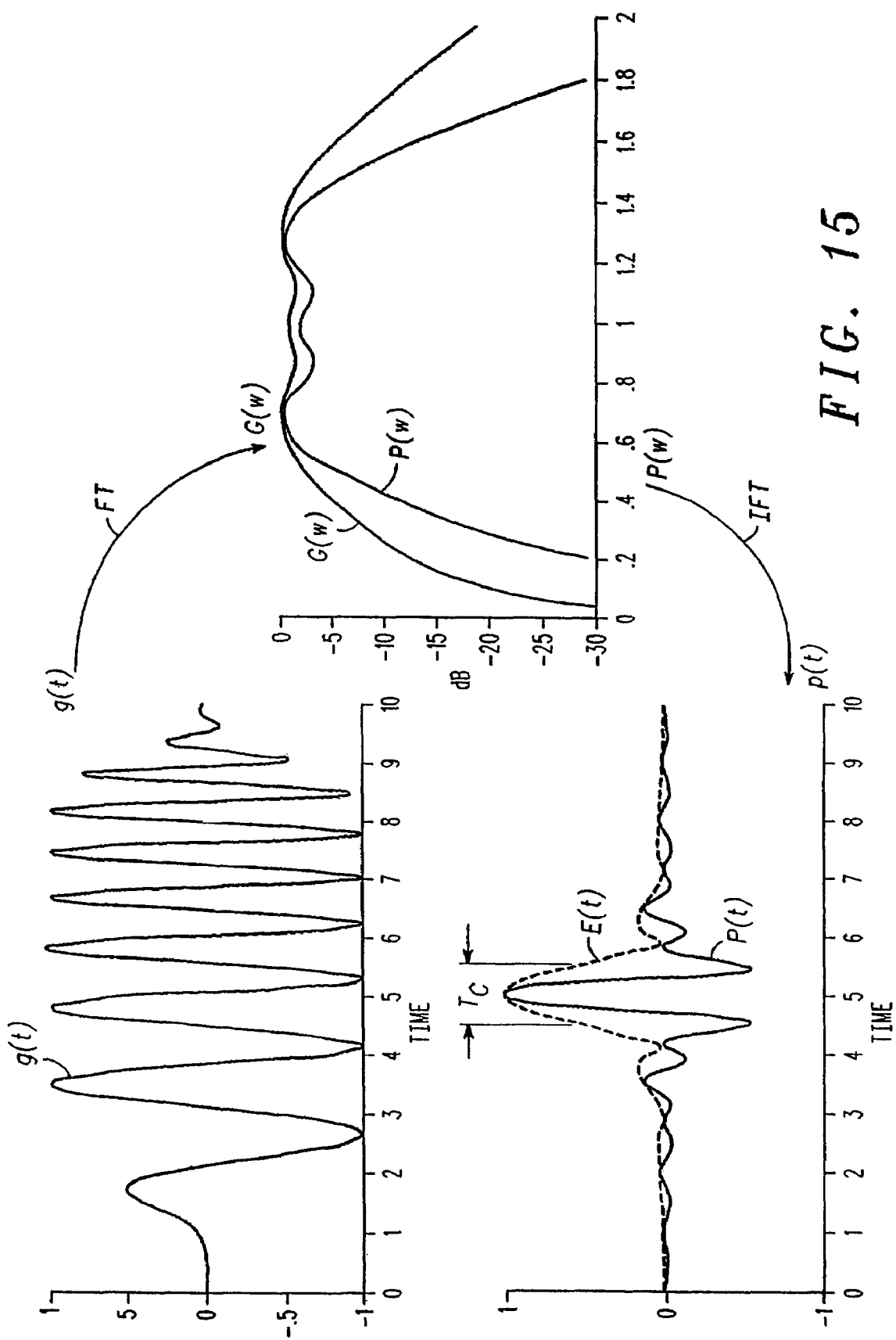
FIG. 15 shows respective time and frequency plots of a chirped waveform before and after being compressed by way of being applied to a matched filter according to the present invention.

FIG. 15 will be used to describe several of these features. FIG. 15 shows in the upper left hand corner thereof a chirped wavelet in the time domain. The equation for producing such a waveform may be seen in the following equation $$g_{t1_i,t2_i,tr_i,tf_i,w_i,k_i}(t) = \left( \frac{1}{e^{\frac{-(t-t1_i)}{3*tr_i}} + 1} - \frac{1}{e^{\frac{-(t-t2_i)}{3*tf_i}} + 1} \right) \cdot \sin(\omega_i t + k_i t^2).$$

Assuming the pulse starts at time t=0, the parameters include the starting frequency, $\omega$, the stopping frequency $\omega+kT$, the rise time tr, the center of the rise time t1, the fall time tf, and the center of the fall time t2. Example values are $\omega=1$, tr=tf=0.25, t1=tr/0.51, and t2=T−tr/9 where T is the pulse width. These chirped waveforms may be sent in sequences separated in time from one another by differing amounts, or by a same amount. PPM is an example where the amount of separation differs. For a given wavelet shape, such as the chirped wavelet shape in the upper left hand corner of FIG. 15, a corresponding frequency domain representation of the wavelet may be obtained by way of a Fourier transform. The time domain version in the upper left hand corner is thus represented g(t) and the Fourier transform version is represented by G(w) shown in the right most plot. Accordingly, the output of the matched filter is represented as P(w)=G(w)·G*(w) is also shown in the right most plot. The output P(w) of the matched filter in the time domain is seen by performing an inverse Fourier transform on H(w) so as to obtain p(t), which is shown in the bottom left hand corner of FIG. 15. The compressed pulse is shown as a solid line, where an envelope with a compressed pulse is shown as a dashed line. A width of the compressed pulse h(t) is defined by Tc which is the time between the points on the envelope E(t) of the compressed pulse that are 6 dB below the peak thereof. The envelope may be determined by the equation $$E(t) = \sqrt{(p(t))^2 + (p^H(t))^2}$$

where $p^H(t)$ is the Hilbert transform of h(t).

The present inventors recognized that it is preferable for the following condition to be satisfied T>2τ. When T is above this limit, the received UWB wavelet is not suppressed by an appreciable amount by the RFI extraction network, which has the network characteristic such that a positive component and a negative component are delayed by 2τ as shown in FIG. 4(b). It is possible for T to be lesser in value, such as T>τ, but it is recognized that at least some signal power and distortion will occur in the compressed wavelet when

τ<T <2τ.

However, an improved signal to interference ratio may result even if T is less than 2τ since the amount of distortion and energy suppression in the compressed wavelet is less than the amount of suppression of the narrow band interference.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. An ultrawide bandwidth receiver, comprising:
an input terminal configured to receive an incoming signal including an ultrawide bandwidth signal and a narrowband signal that overlap in frequency;
an interference extraction circuit for receiving the incoming signal from the input terminal and providing an output signal to an extraction circuit output terminal, the interference extraction circuit being configured to have an impulse response including: a first component that has a first impulsive shape, and at least one other component delayed in time from the first component, and having a second impulsive shape;
an ultrawide bandwidth signal detector connected to the extraction circuit output terminal, and configured to detect the ultrawide bandwidth signal;
a splitter connected to the input terminal, and operating to split the incoming signal into at least a first split signal and a second split signal, the first split signal being provided to a first splitter output terminal, the second split signal being provided to a second splitter output terminal;
a delay element connected to the first splitter output terminal for delaying the first split signal by a delay time to provide a delayed signal at a delay output terminal; and
a combiner for combining the delayed signal and the second split signal to form the output signal,
wherein the interference extraction circuit allows energy from the ultrawide bandwidth signal to be conveyed to the extraction circuit output terminal and substantially blocks energy from the narrowband interference signal from being output to the extraction circuit output terminal.

2. An ultrawide bandwidth receiver, as recited in claim 1, further comprising a controller configured to control operations of the ultrawide bandwidth signal detector and the interference extraction circuit.

3. An ultrawide bandwidth receiver, as recited in claim 1, wherein the ultrawide bandwidth signal detector is a correlator.

4. An ultrawide bandwidth receiver, as recited in claim 1, wherein the correlator is one of: a tracking correlator and an analog correlator.

5. An ultrawide bandwidth receiver, as recited in claim 1, wherein the input terminal is connected to an antenna.

6. An ultrawide bandwidth receiver, as recited in claim 1, wherein the interference extraction circuit further comprises an isolation device configured to couple the splitter to the combiner.

7. An ultrawide bandwidth receiver, as recited in claim 6, wherein the isolation device is an inverting isolation device.

8. An ultrawide bandwidth receiver, as recited in claim 6, wherein the isolation device includes an amplifier.

9. An ultrawide bandwidth receiver, as recited in claim 1, wherein the second splitter output terminal is an inverting output terminal.

10. An ultrawide bandwidth receiver, as recited in claim 1, wherein the delay element comprises a transmission line.

11. An ultrawide bandwidth receiver, as recited in claim 1, wherein the delay element comprises one or mote series resistor element and at least one shunt capacitor element.

12. An ultrawide bandwidth receiver, as recited in claim 11, wherein the at least one shunt capacitor element is electrically adjustable.

13. An ultrawide bandwidth receiver, as recited in claim 11, wherein the at least one shunt capacitor element is a varactor.

14. An ultrawide bandwidth receiver, as recited in claim 1, further comprising:
a monitoring mechanism configured to monitor at least one of a composite output level of the output signal; and
a controller configured to adjust delay time and determine a desired delay that results in the composite output level being a minimum.

15. An ultrawide bandwidth receiver, as recited in claim 14, wherein the controller is configured to adjust the delay time across a range of possible delay times that corresponds with a bandwidth that contains the ultrawide bandwidth signal.

16. A radio frequency interference extraction mechanism for receiving an incoming ultrawide bandwidth signal and providing an adjusted ultrawide bandwidth signal that has any narrowband interference signal that coincides with the ultrawide bandwidth signal in frequency suppressed, comprising:

a radio front end, having an impulse response including a first impulse response component and a second impulse response component, for receiving the incoming ultrawide bandwidth signal and generating the adjusted ultrawide bandwidth signal;

a controller configured to control the radio front end to adjust a relative position of the first impulse response component and the second impulse response component; and a control receiver configured to detect at least one of a signal energy level and a signal to noise ratio of the narrowband interference signal and to provide an indication to the controller regarding a characteristic feature of the narrowband interference signal, wherein the radio front end comprises a plurality of adjustable-bias amplifiers connected in series for receiving the first impulse response component and generating the second impulse response component, and wherein the controller is configured to set bias values in the adjustable-bias amplifiers.

17. A radio frequency interference extraction mechanism, as recited in claim 16, wherein the controller further comprises a power sensor configured to determine a power level of the adjusted ultrawide bandwidth signal and inform the controller of the power level.

18. A radio frequency interference extraction mechanism, as recited in claim 16, wherein the controller farther comprises:
a memory configured to hold a table of target biases corresponding to delays used by the controller when setting the bias values in the adjustable-bias amplifiers.

19. A radio frequency interference extraction mechanism, as recited in claim 16, wherein one or more of the plurality of adjustable-bias amplifiers can be switchably bypassed, allowing a remaining set of the plurality of adjustable-bias amplifiers to generate the second impulse response component based on the first impulse response component.

20. A radio frequency interference extraction mechanism, as recited in claim 16, further comprising a subtracting circuit configured to either subtract the second impulse response component from the first impulse response component, or to subtract the first impulse response component from the second impulse response component, in order to generate the adjusted ultrawide bandwidth signal.

* * * * *

UNITED STATES PATENT AND TRADEMARK OFFICE
CERTIFICATE OF CORRECTION

PATENT NO. : 7,315,564 B2  Page 1 of 1
APPLICATION NO. : 11/214741
DATED : August 31, 2005
INVENTOR(S) : John W. McCorkle It is certified that error appears in the above-identified patent and that said Letters Patent is hereby corrected as shown below:

In Column 23, Line 23, Claim No. 11:
Change "delay element comprises one or mote series" to --delay element comprises one or more series--

In Column 24, Line 29, Claim No. 18:
Change "wherein the controller farther" to --wherein the controller further--

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,315,564 B2 | Page 1 of 1 |
| APPLICATION NO. | : 11/214741 | |
| DATED | : January 1, 2008 | |
| INVENTOR(S) | : John W. McCorkle | |

It is certified that error appears in the above-identified patent and that said Letters Patent is hereby corrected as shown below:

In Column 23, Line 23, Claim No. 11:
    Change "delay element comprises one or mote series" to --delay element comprises one or more series--

In Column 24, Line 29, Claim No. 18:
    Change "wherein the controller farther" to --wherein the controller further--

This certificate supersedes the Certificate of Correction issued July 22, 2008.

Signed and Sealed this

Twelfth Day of August, 2008

JON W. DUDAS
*Director of the United States Patent and Trademark Office*